United States Patent
Moon et al.

(10) Patent No.: US 9,166,747 B2
(45) Date of Patent: Oct. 20, 2015

(54) METHOD AND DEVICE FOR A HYBRID AUTOMATIC REPEAT REQUEST IN A MULTI-CARRIER SYSTEM

(75) Inventors: Sung Ho Moon, Anyang-si (KR); Jae Hoon Chung, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 13/574,599

(22) PCT Filed: Jan. 12, 2011

(86) PCT No.: PCT/KR2011/000198
§ 371 (c)(1),
(2), (4) Date: Sep. 11, 2012

(87) PCT Pub. No.: WO2011/090289
PCT Pub. Date: Jul. 28, 2011

(65) Prior Publication Data
US 2012/0327783 A1 Dec. 27, 2012

Related U.S. Application Data

(60) Provisional application No. 61/297,231, filed on Jan. 21, 2010.

(30) Foreign Application Priority Data

Jan. 11, 2011 (KR) .......................... 10-2011-0002526

(51) Int. Cl.
*H04W 72/04* (2009.01)
*H04L 1/18* (2006.01)
(Continued)

(52) U.S. Cl.
CPC .............. *H04L 1/1861* (2013.01); *H04L 5/001* (2013.01); *H04L 5/0055* (2013.01); *H04L 5/0094* (2013.01); *H04L 27/2647* (2013.01)

(58) Field of Classification Search
None
See application file for complete search history.

(56) References Cited

U.S. PATENT DOCUMENTS 7,400,898 B2 * 7/2008 Kang et al. .................... 455/518
8,305,998 B2 * 11/2012 Marinier et al. .............. 370/334
(Continued)

OTHER PUBLICATIONS

LG Electronics, "HARQ process mapping across aggregated component carriers", R1-092125, 3GPP TSG RAN WG1 #57, May 2009.
(Continued)

*Primary Examiner* — Rhonda Murphy
(74) *Attorney, Agent, or Firm* — Lee, Hong, Degerman, Kang & Waimey

(57) ABSTRACT

A method of performing hybrid automatic repeat request (HARQ) in a carrier aggregation system is provided. The method includes: monitoring a downlink (DL) grant for initial DL data transmission in a first DL component carrier (CC); receiving initial DL data through a second DL CC indicated by the DL grant; decoding the initial DL data; transmitting a not-acknowledgment (NACK) signal when decoding of the initial DL data fails; monitoring a DL grant for retransmission of the DL data in the first DL CC; and receiving DL data retransmitted through the second DL CC, wherein the second DL CC is any one of a plurality of DL CCs having a predetermined link relation with the first DL CC, and the DL grant for the initial transmission includes a carrier indication field indicating the second DL CC and resource allocation information for the initially transmitted DL data.

10 Claims, 19 Drawing Sheets

(51) Int. Cl.
*H04L 5/00* (2006.01)
*H04L 27/26* (2006.01)

(56) References Cited

U.S. PATENT DOCUMENTS

2010/0251054 A1* 9/2010 Cai et al. ................. 714/748
2013/0010709 A1* 1/2013 Earnshaw et al. ............ 370/329

OTHER PUBLICATIONS

Catt, "UL ACK/NACK transmission scheme for LTE-A", R1-092789, 3GPP TSG RAN WG1 Meeting #57bis, Jun. 2009.
Samsung, "UL ACK/NAK Transmission in LTE-A", R1-092668, 3GPP TSG RAN WG1 #57bis, Jun. 2009.
ZTE, "Uplink Control Channel Design for LTE-Advanced", R1-092464, 3GPP TSG-RAN WG1 #57bis, Jun. 2009.

* cited by examiner

FIG. 9
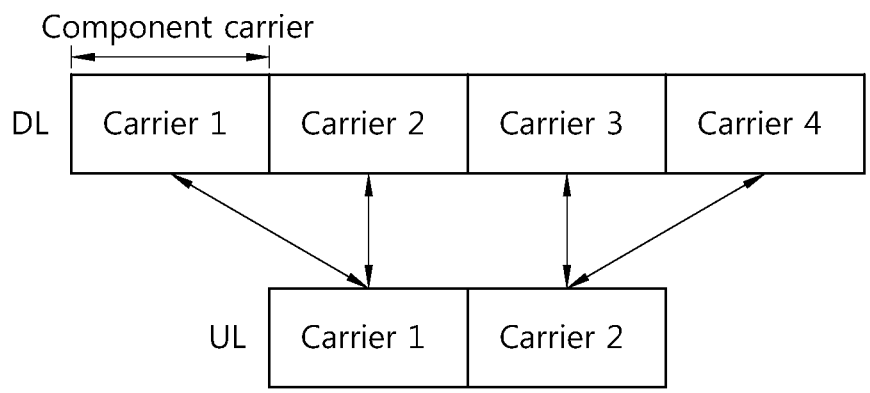
(a) # of DL CC (component carrier) ># of UL CC
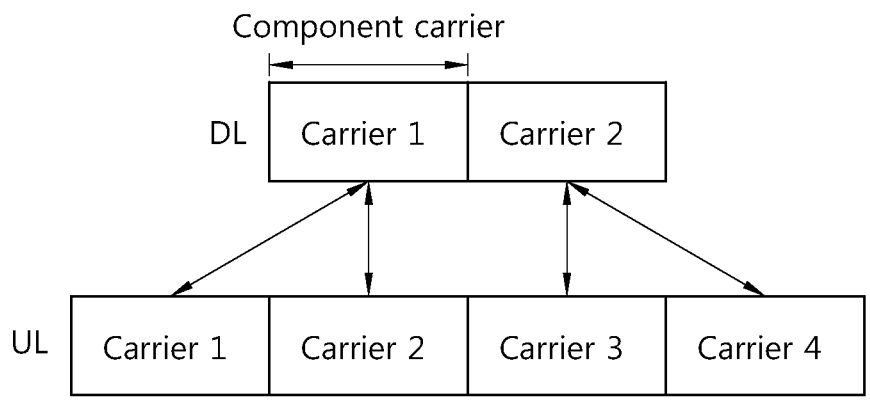
(b) # of UL CC > # of DL CC

METHOD AND DEVICE FOR A HYBRID AUTOMATIC REPEAT REQUEST IN A MULTI-CARRIER SYSTEM

CROSS-REFERENCE TO RELATED APPLICATIONS

This application is the National Stage filing under 35 U.S.C. 371 of International Application No. PCT/ KR2011/000198, filed on Jan. 12, 2011, which claims the benefit of earlier filing date and right of priority to Korean Application No. 10-2011-0002526, filed on Jan. 11, 2011, and also claims the benefit of U.S. Provisional Application Serial No. 61/297, 231, filed on Jan. 21, 2010, the contents of which are all incorporated by reference herein in their entirety.

TECHNICAL FIELD

The present invention relates to wireless communications, and more particularly, to a method and apparatus for performing hybrid automatic repeat request (HARQ) in a multi-carrier system.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy the required higher data rate, a system is designed such that a basic requirement which requires separate bands capable of operating respective independent systems is satisfied. Further, a carrier aggregation (CA) is introduced. In concept, the CA aggregates a plurality of bands into one system. In this case, a band that can be independently managed is defined as a component carrier (CC).

To support growing transmission capacity, the 3GPP LTE or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, the carrier aggregation system uses a plurality of CCs, and in this sense, it can be called a multi-carrier system.

In order to increase reliability of data transmission in the multi-carrier system, hybrid automatic repeat request (HARQ) can be used. The HARQ is a method in which a receiving end receives data and thereafter reports whether the reception is successful to a transmitting end by using an acknowledgement/not-acknowledgement (ACK/NACK) signal, and the transmitting end transmits new data or retransmits data which fails in reception according to the ACK/NACK signal. Since the multi-carrier system uses a plurality of carriers, data and control information such as resource allocation information can be transmitted in different CCs. In this case, the control information may include a carrier indication field (CIF) indicating a CC on which the data is transmitted. However, there may be a case where the CIF is unnecessary in the process of performing HARQ.

SUMMARY OF INVENTION

Technical Problem

The present invention provides a method and apparatus for performing hybrid automatic repeat request (HARQ) in a multi-carrier system.

Technical Solution

According to one aspect of the present invention, a method of performing hybrid automatic repeat request (HARQ) in a carrier aggregation system is provided. The method includes: monitoring a downlink (DL) grant for initial DL data transmission in a first DL component carrier (CC); receiving initial DL data through a second DL CC indicated by the DL grant; decoding the initial DL data; transmitting a not-acknowledgment (NACK) signal if decoding of the initial DL data fails; monitoring the DL grant for retransmission of the DL data in the first DL CC; and receiving DL data retransmitted through the second DL CC, wherein the second DL CC is any one of a plurality of DL CCs having a predetermined link relation with the first DL CC, and the DL grant for the initial transmission includes a carrier indication field indicating the second DL CC and resource allocation information for the initially transmitted DL data.

In the aforementioned aspect of the present invention, the DL grant for retransmission may include other fields than the carrier indication field.

In addition, the DL grant for retransmission may consist of the same bit size as the DL grant for initial transmission, and the carrier indication field included in the DL grant for retransmission may be used for other usages than indicating the second DL CC.

In addition, the carrier indication field may be used for error detection of the resource allocation information for the retransmitted DL data.

In addition, the first DL CC may be any one of a plurality of DL CCs configured through a higher layer signal.

In addition, the DL grant for initial transmission and the DL grant for retransmission may be transmitted through a physical downlink control channel (PDCCH).

In addition, the carrier indication field may consist of 3 bits.

In addition, the NACK signal may be transmitted four subframes later from a subframe in which the initial DL data is received.

In addition, a subframe in which the retransmitted DL data is received may be a subframe located 8 subframes later from the subframe in which the initial DL data is received.

In addition, the first DL CC and the second DL CC may be component carriers having the same bandwidth and different centre frequencies.

According to another aspect of the present invention, a user equipment is provided. The user equipment includes: a radio frequency (RF) unit for transmitting and receiving a radio signal; and a processor coupled to the RF unit, wherein the processor is configured for: monitoring a DL grant for initial DL data transmission in a first DL CC; receiving initial DL data through a second DL CC indicated by the DL grant; decoding the initial DL data; transmitting a NACK signal if decoding of the initial DL data fails; monitoring the DL grant for retransmission of the DL data in the first DL CC; and receiving DL data retransmitted through the second DL CC, wherein the second DL CC is any one of a plurality of DL CCs having a predetermined link relation with the first DL CC, and the DL grant for the initial transmission includes a carrier indication field indicating the second DL CC and resource allocation information for the initially transmitted DL data.

Advantageous Effects

According to the present invention, a carrier indication field can be utilized for other usages than indicating a component carrier when performing hybrid automatic repeat request (HARQ) in a multi-carrier system.

DESCRIPTION OF DRAWINGS

FIG. 9 is an example of a DL/UL asymmetric carrier aggregation system to which the present invention is applicable.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of evolved UMTS (E-UMTS) using the E-UTRA. The 3GPP LTE uses the OFDMA in a downlink and uses the SC-FDMA in an uplink. LTE-advance (LTE-A) is evolved from the 3GPP LTE.

For clarity, the following description assumes a situation where the present invention applies to an LTE-A system. However, technical features of the present invention are not limited thereto.

Figure 1:
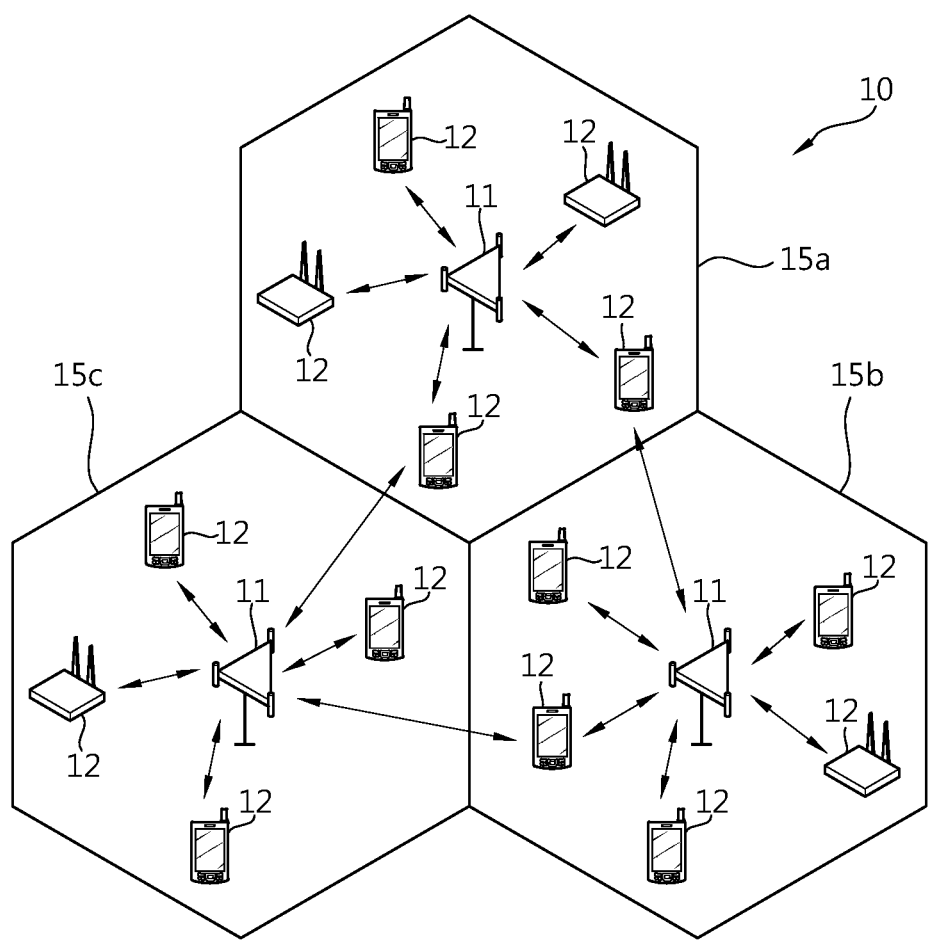
FIG. 1 is an example of a wireless communication system according to an embodiment of the present invention.

FIG. 1 is an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighboring cell. A BS that provides a communication service to the adjacent cell is called a neighbor BS. The serving cell and the neighbor cell are determined relatively with respect to the UE.

In general, a downlink implies communication from the BS 11 to the UE 12, and an uplink implies communication from the UE 12 to the BS 11.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The Tx antenna implies a physical or logical antenna used to transmit one signal or stream. The Rx antenna implies a physical or logical antenna used to receive one signal or stream.

Figure 2:
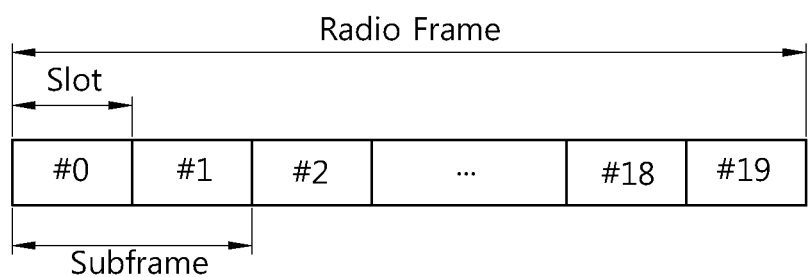
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. The OFDM symbol is for representing one symbol period. The OFDM symbol can be referred to as other terms. For example, the OFDM symbol can also be referred to as an orthogonal frequency division multiple access (OFDMA) symbol or, when single carrier-frequency division multiple access (SC-FDMA) is used as an uplink multiple-access scheme, can also be referred to as an SC-FDMA symbol.

In 3GPP LTE, it is defined such that one slot includes 7 OFDM symbols in a normal cyclic prefix (CP) and one slot includes 6 OFDM symbols in an extended CP.

The above radio frame structure is shown for exemplary purposes only. Thus, the number of subframes included in the radio frame or the number of slots included in the subframe or the number of OFDM symbols included in the slot may change variously.

Figure 3:
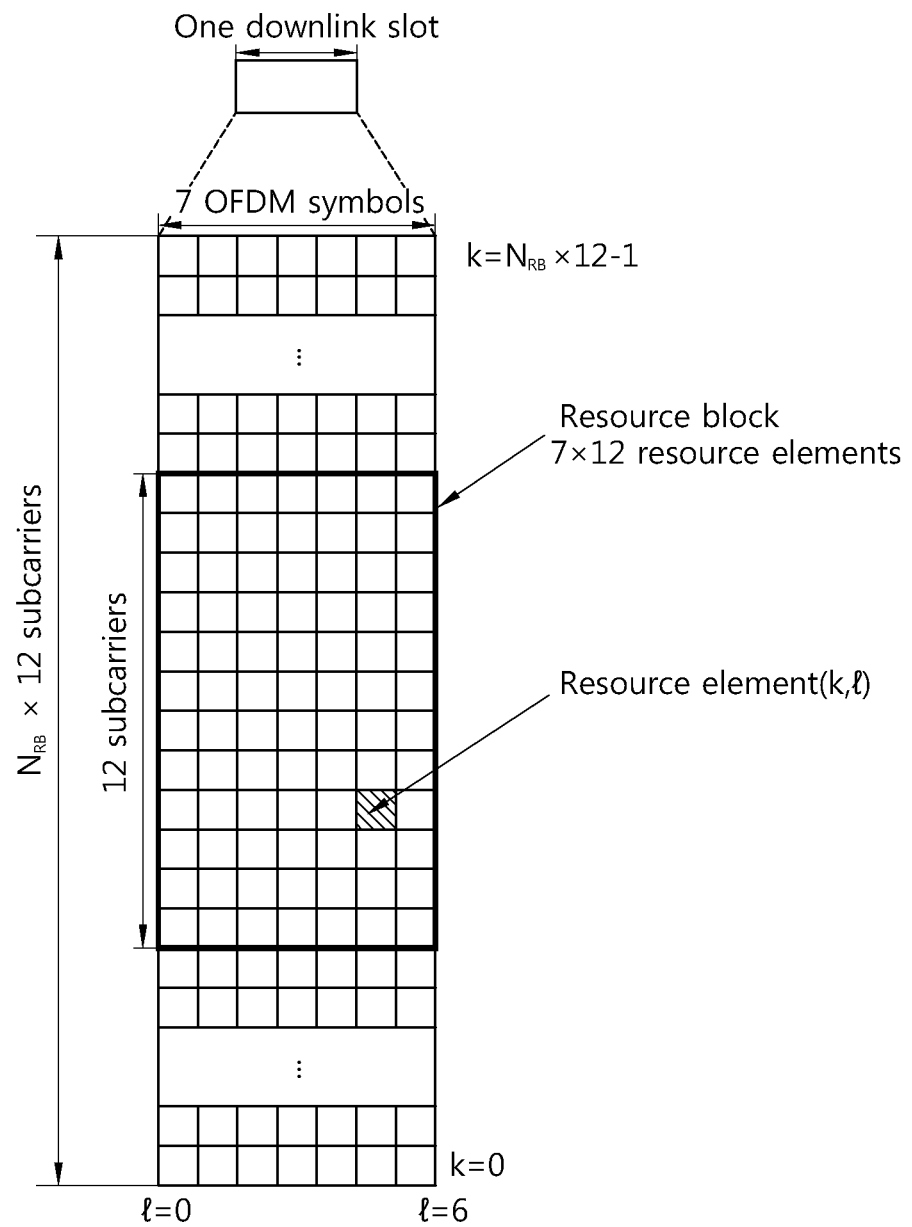
FIG. 3 shows an example of a resource grid for one downlink (DL) slot.

FIG. 3 shows an example of a resource grid for one downlink slot.

The downlink slot includes a plurality of OFDM symbols in a time domain and a plurality of $N_{RB}$ resource blocks (RBs) in a frequency domain. The RB is a resource allocation unit, and includes one slot in the time domain and a plurality of contiguous subcarriers in the frequency domain.

The number $N_{RB}$ of RBs included in the downlink slot depends on a downlink transmission bandwidth determined in a cell. For example, in an LTE system, $N_{RB}$ may be any one value in the range of 6 to 110. An uplink slot may have the same structure as the downlink slot.

Each element on the resource grid is referred to as a resource element (RE). The RE on the resource grid can be identified by an index pair (k, l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described herein that one RB includes 7×12 REs consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a CP length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
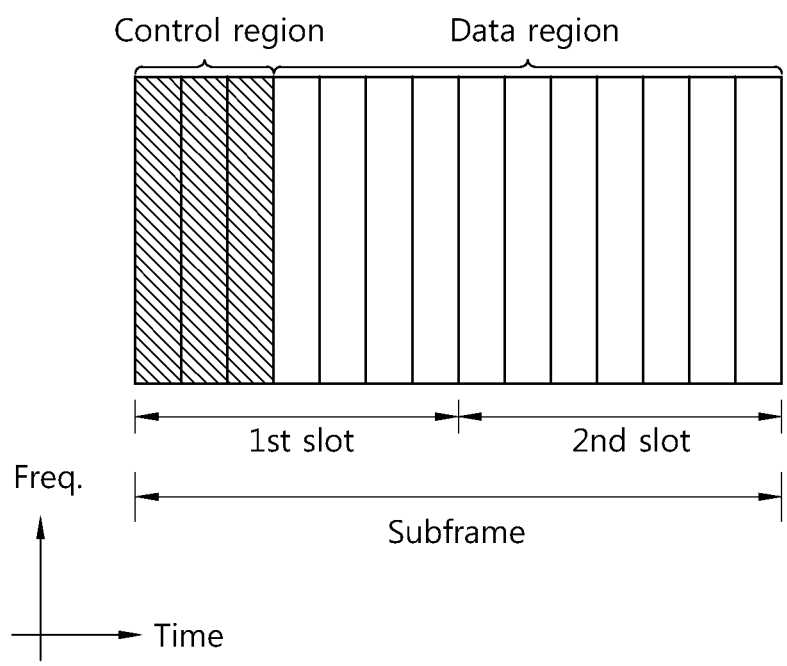
FIG. 4 shows a structure of a DL subframe.

FIG. 4 shows a structure of a downlink subframe.

The downlink subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region. The PDSCH implies a channel in which a BS transmits data to a UE.

A physical control format indicator channel (PCFICH), a physical hybrid ARQ indicator channel (PHICH), a physical downlink control channel (PDCCH), or the like can be transmitted in the control region. The PCFIDH is a physical channel for transmitting a format indicator indicating a format of the PDCCH, that is, the number of OFDM symbols constituting the PDCCH, to the UE. The PCFIDH is included in every subframe. The format indicator can also be called as a control format indicator (CFI).

The PHICH carries an HARQ ACK/NACK signal in response to uplink transmission.

A physical downlink control channel (PDCCH) can carry a downlink shared channel (DL-SCH)'s resource allocation (referred to as a downlink (DL) grant) and transmission format, uplink shared channel (UL-SCH)'s resource allocation information (referred to as an uplink (UL) grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. The UE cannot know about a specific position in a control region in which its PDCCH is transmitted and about a specific CCE aggregation or DCI format used for PDCCH transmission.

A plurality of PDCCHs can be transmitted in one subframe. The UE monitors a plurality of PDCCHs in every subframe. Herein, monitoring is an operation of attempting PDCCH decoding by the UE according to a format of the monitored PDCCH.

The 3GPP LTE uses a search space to reduce an overload caused by blind decoding. The search space can be called a monitoring set of CCEs for the PDCCH. The UE monitors the PDCCH within the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

The conventional DCI formats transmitted through the PDCCH will be described.

A DCI format includes fields described below, and the respective fields can be mapped to information bits $a_0$ to $a_{A-1}$. The respective fields can be mapped in the same order as described in the respective DCI formats. Each field may have zero-padding bits. A first field can be mapped to an information bit $a_0$ having a lowest order, and consecutive other fields can be mapped to information bits having higher orders. In each field, a most significant bit (MSB) can be mapped to an information bit having a lowest order of a corresponding field. For example, an MSB of the first field can be mapped to $a_0$. Hereinafter, a set of fields included in the respective conventional DCI formats is called an information field.

1. DCI format 0

A DCI format 0 is used for PUSCH scheduling. Examples of information (field) transmitted by using the DCI format 0 are as follows.

1) a flag for identifying the DCI format 0 and a DCI format 1A (if the flag is 0, it indicates the DCI format 0, and if the flag is 1, it indicates the DCI format 1A), 2) a hopping flag (1 bit), 3) a resource block designation and a hopping resource allocation, 4) a modulation and coding scheme and a redundancy version (5 bits), 5) a new data indicator (1 bit), 6) a TPC command (2 bits) for a scheduled PUSCH, 7) a cyclic shift (3 bits) for DM-RS, 8) a UL index, 9) a DL designation index (only in a TDD), 10) CQI request, etc. If the number of information bits in the DCI format 0 is less than a payload size of the DCI format 1A, '0' is padded so that it is equal to the payload size of the DCI format 1A.

2. DCI format 1

A DCI format 1 is used for one PDSCH codeword scheduling. Examples of information transmitted in the DCI format 1 are as follows.

1) a resource allocation header (indicating a resource allocation type 0/type 1)—if a DL bandwidth is less than 10 PRBs, the resource allocation header is not included and the resource allocation type 0 is assumed. 2) a resource block designation, 3) a modulation and coding scheme, 4) an HARQ process number, 5) a new data indicator, 6) a redundancy version, 7) a TPC command for a PUCCH, 8) a DL designation index (only in a TDD), etc. If the number of information bits of the DCI format 1 is equal to that of the DCI format 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and has a payload size different from that of the DCI format 0/1A.

3. DCI format 1A

A DCI format 1A is used for compact scheduling of one PDSCH codeword or a random access process.

Examples of information transmitted in the DCI format 1A are as follows.

1) a flag for identifying the DCI format 0 and the DCI format 1A, 2) a localized/distributed VRB designation flag, 3) a resource block designation, 4) a modulation and coding scheme, 5) an HARQ process number, 6) a new data indicator, 7) a redundancy version, 8) a TPC command for a PUCCH, 9) a DL designation index (only in a TDD), etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI format 1B

A DCI format 1B includes precoding information and is used for compact scheduling for one PDSCH codeword. Examples of information transmitted in the DCI format 1B are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) transmitted precoding matrix indicator (TPMI) information for precoding, 10) a PMI confirmation for precoding, etc. If the number of information bits in the DCI format 1B is equal to any one of {12, 14, 16, 20, 24, 26, 32, 40, 44, 56}, a bit having one value of '0' is added to the DCI format 1B.

5. DCI format 1C

A DCI format 1C is used for very compact scheduling for one PDSCH codeword. Examples of information transmitted in the DCI format 1C are as follows.

1) an indicator indicating a gap value, 2) a resource block designation, 3) a transport block size index, etc.

6. DCI format 1D

A DCI format 1D includes precoding and power offset information and is used for compact scheduling for one PDSCH codeword.

Examples of information transmitted in the DCI format 1D are as follows.

1) a localized/distributed VRB designation flag, 2) a resource block designation, 3) a modulation and coding scheme, 4) an HARQ process number, 5) a new data indicator, 6) a redundancy version, 7) a TPC command for a PUCCH, 8) a DL designation index (only in a TDD), 9) TPMI information for precoding, 10) a DL power offset, etc. If the number of information bits in the DCI format 1D is equal to any one of {12, 14, 16, 20, 24, 26, 32, 40, 44, 56}, a bit having one value of '0' is added to the DCI format 1D.

7. DCI format 2

A DCI format 2 is used to designate a PDSCH for a close-loop MIMO operation. Examples of information transmitted in the DCI format 2 are as follows.

1) a resource allocation header, 2) a resource block designation, 3) a TPC command for a PUCCH, 4) a DL designation index (only in a TDD), 5) an HARQ process number, 6) a transport block to codeword swap flag, 7) a modulation and coding scheme, 8) a new data indicator, 9) a redundancy version, 10) precoding information, etc.

8. DCI format 2A

A DCI format 2A is used to designate a PDSCH for an open-loop MIMO operation. Examples of information transmitted in the DCI format 2A are as follows.

1) a resource allocation header, 2) a TPC command for a PUCCH, 3) a DL designation index (only in a TDD), 4) an HARQ process number, 5) a transport block to codeword swap flag, 6) a modulation and coding scheme, 7) a new data indicator, 8) a redundancy version, 9) precoding information, etc.

9. DCI format 3

A DCI format 3 is used to transmit a TPC command for a PUCCH and a PUSCH through 2-bit power regulation. Examples of information transmitted in the DCI format 3 are as follows.

1) N transmit power control (TPC) commands. Herein, N is determined by Equation 1 below.

$$N = \left\lfloor \frac{L_{format0}}{2} \right\rfloor \quad \text{[Equation 1]}$$

Herein, $L_{format0}$ is equal to a payload size of a DCI format 0 before CRC is attached. If floor($L_{format0}/2$) is less than $L_{format0}/2$, one bit having a value of '0' is added.

10. DCI format 3A

A DCI format 3A is used to transmit a TPC command for a PUCCH and a PUSCH through 1-bit power regulation. Examples of information transmitted in the DCI format 3A are as follows.

1) M TPC commands. Herein, $M=L_{format0}$. $L_{format0}$ is equal to a payload size of a DCI format 0 before CRC is attached.

The section 5.3.3.1 of 3GPP TS 36.212 V8.7.0(2009-05) can be incorporated herein to describe the DCI formats.

A DL transmission mode between a BS and a UE can be classified into 7-modes as follows.

1. A single antenna port: Precoding is not performed in this mode.
2. Transmit diversity: Transmit diversity can be used in 2 or 4 antenna ports using SFBC.
3. Open-loop spatial multiplexing: This is an open-loop mode in which rank adaptation based on RI feedback is possible. The transmit diversity is applicable when a rank is 1. A great delay CDD can be used when the rank is greater than 1.
4. Closed-loop spatial multiplexing: This is a mode in which precoding feedback supporting dynamic rank adaptation is applied.
5. Multi-user MIMO
6. Closed-loop rank-1 precoding
7. Single-antenna port: This is a mode that can be used for beamforming when a UE-specific reference signal is used.

Table 1 below shows an example of a DCI format to be monitored by a UE according to the aforementioned DL transmission mode.

TABLE 1

| Transmission mode | DCI format to be monitored |
| --- | --- |
| 1. Single-antenna port; port 0 | DCI 0/1A, DCI 1 |
| 2. Transmit diversity | DCI 0/1A, DCI 1 |
| 3. Open-loop spatial multiplexing | DCI 0/1A, DCI 2A |
| 4. Close-loop spatial multiplexing | DCI 0/1A, DCI 2 |
| 5. Multi-user MIMO | DCI 0/1A, DCI 1D |
| 6. closed-loop rank = 1 precoding | DCI 0/1A, DCI 1B |
| 7. Single-antenna port; port 5 | DCI 0/1A, DCI 1 |

Table 2 below shows an example of the number of blind decoding attempts of the UE.

TABLE 2

| Search Space Type | Aggregation level L | Size [In CCEs] | Number of PDCCH candidates | DCI formats | # of blind decodings |
| --- | --- | --- | --- | --- | --- |
| UE-specific | 1 | 6 | 6 | 0, 1, 1A, 1B, 1D, 2, 2A | (6 + 6 + 2 + 2) * 2 = 32 |
| | 2 | 12 | 6 | | |
| | 4 | 8 | 2 | | |
| | 8 | 16 | 2 | | |
| Common | 4 | 16 | 4 | 0, 1A, 1C, 3/3A | (4 + 2) * 2 = 12 |
| | 8 | 16 | 2 | | |

As shown in Table 2, the UE may have to perform up to 44 blind decoding attempts. The UE receives information regarding a bandwidth of a carrier, a transmission mode, the number of antenna ports, etc., through system information from the BS, and thus can know in advance a payload size of a PDCCH to be detected when performing blind decoding. The UE performs 44 blind decoding attempts in total, i.e., 32 (i.e., 16×2=32) attempts in a UE-specific search space and 12 (i.e., 6×2=12) attempts in a common search space, for each of a DL and a UL with respect to the pre-known payload size of the PDCCH.

Figure 5:
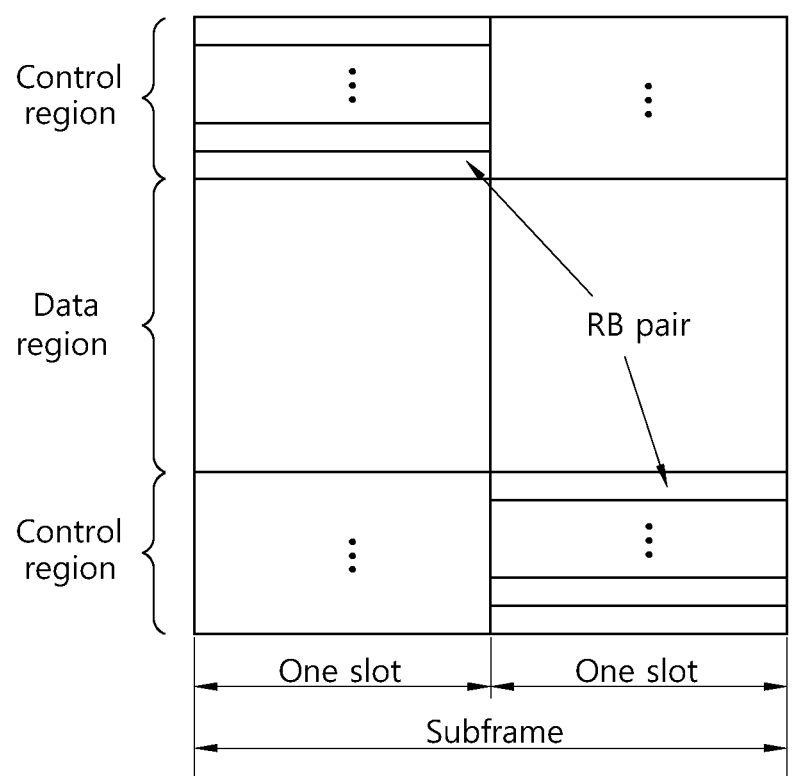
FIG. 5 shows a structure of an uplink (UL) subframe.

FIG. 5 shows a structure of a UL subframe.

The UL subframe can be divided into a control region and a data region in a frequency domain. A physical uplink control channel (PUCCH) for transmitting UL control information is allocated to the control region. A physical uplink shared channel (PUSCH) for transmitting data is allocated to the data region. To maintain a single-carrier property, a UE does not simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits UL control information over time through different subcarriers, a frequency diversity gain can be obtained.

Examples of UL control information transmitted on the PUCCH include hybrid automatic repeat request (HARQ) acknowledgement (ACK)/non-acknowledgment (NACK), a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the UL data may consist of only control information.

In the LTE-A system, an SC-FDMA transmission scheme is applied in a UL. SC-FDMA is a transmission scheme in which IFFT is performed after DFT spreading is performed. The SC-FDMA is also called DFT-spread OFDM (DFT-s OFDM). A peak-to-average power ratio (PAPR) or a cubic metric (CM) can decrease in the SC-FDMA. When using the SC-FDMA transmission scheme, a non-linear distortion duration of a power amplifier can be avoided and thus transmit power efficiency can increase in a UE in which power consumption is limited. Accordingly, a user throughput can increase.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target wideband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in a UL is equal to the number of carriers used in a DL, it is necessary to configure such that all CCs are compatible with the LTE Rel-8 system.

In order to efficiently use a plurality of carriers, the plurality of carriers can be managed by media access control (MAC).

Figure 6:
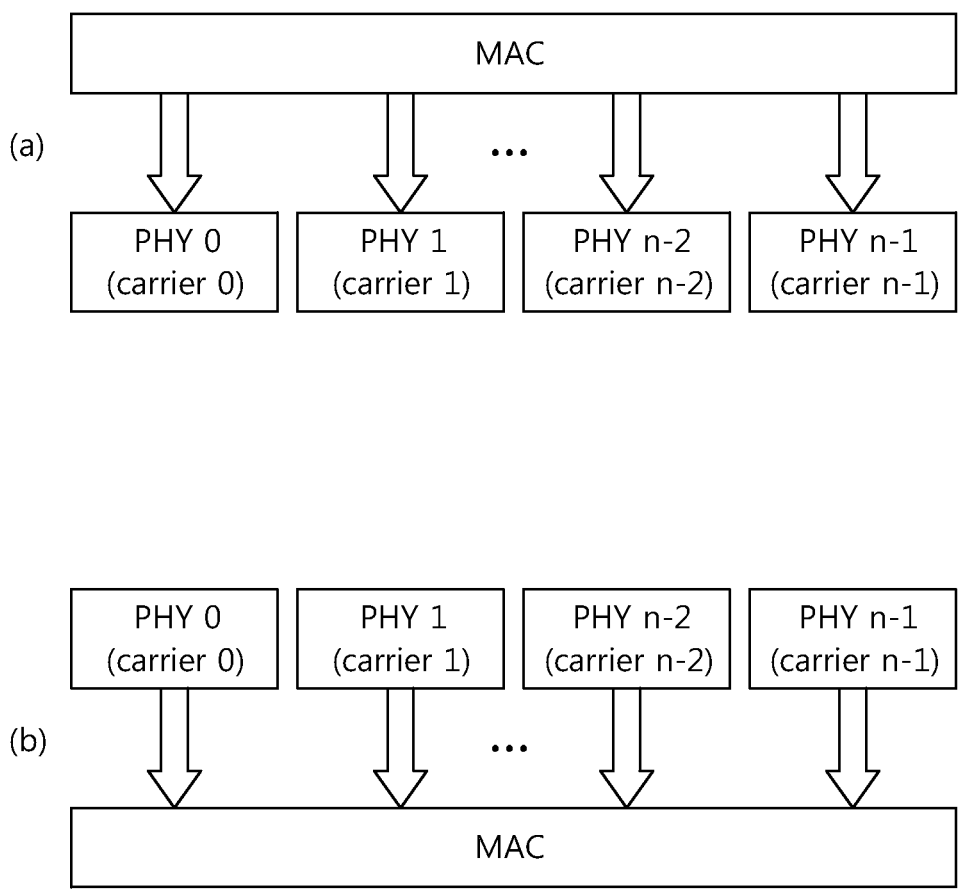
FIG. 6 shows an example of a base station (BS) and a user equipment (UE) which constitute a carrier aggregation system.

FIG. 6 shows an example of a BS and a UE which constitute a carrier aggregation system.

In the BS of FIG. 6(a), one MAC transmits and receives data by managing and operating all of n carriers. This is also applied to the UE of FIG. 6(b). From the perspective of the UE, one transport block and one HARQ entity may exist per CC. The UE can be scheduled simultaneously for a plurality of carriers. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 7:
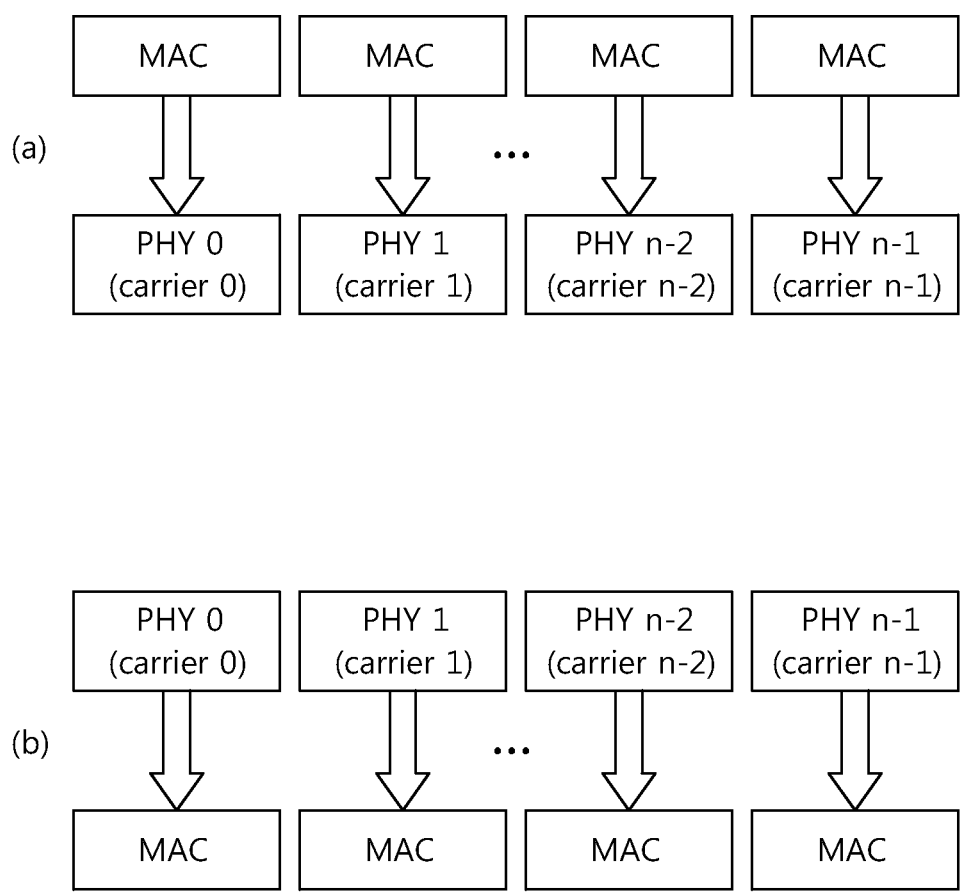
FIG. 7 and FIG. 8 show other examples of a BS and a UE which constitute a carrier aggregation system.
Figure 8:
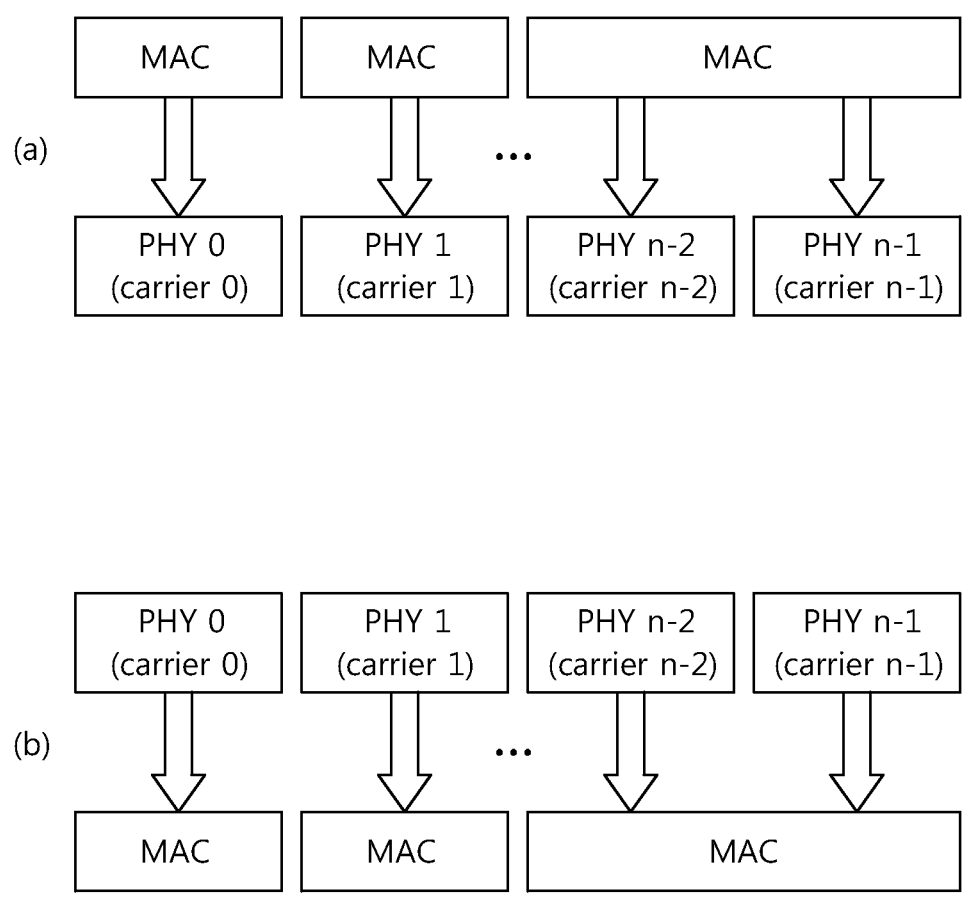

FIG. 7 and FIG. 8 show other examples of a BS and a UE which constitute a carrier aggregation system.

In the BS of FIG. 7(a) and the UE of FIG. 7(b), one MAC manages only one carrier. That is, the MAC and the carrier are 1:1 mapped. In the BS of FIG. 8(a) and the UE of FIG. 8(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, a plurality of carriers can be used by being divided for a UL usage and a DL usage. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

Hereinafter, each carrier that can be used to configure a broadband carrier in a multi-carrier system (or a carrier aggregation system) is called a component carrier (CC). For backward compatibility with the legacy system, the CC can directly use a bandwidth used in the legacy system. For example, the 3GPP LTE system supports bandwidths of 1.4 MHz, 3 MHz, 5 MHz, 10 MHz, 15 MHz, and 20 MHz. Therefore, in the 3GPP LTE-A system, each CC can have any one of the bandwidths of 1.4 MHz, 3 MHz, 5 MHz, 10 MHz, 15 MHz, and 20 MHz, and a plurality of CCs can be aggregated when configuring a broadband equal to or greater than 20 MHz. Hereinafter, for convenience of explanation, a CC used for an uplink can be simply referred to as an uplink component carrier (UL CC), and a CC used for a downlink can be simply referred to as a downlink component carrier (DL CC). FIG. 9 is an example of a downlink (DL)/uplink (UL) asymmetric carrier aggregation system to which the present invention is applicable.

FIG. 9(a) shows a case where the number of DL CCs is greater than the number of UL CCs, and FIG. 9(b) shows a case where the number of UL CCs is greater than the number of DL CCs. Although FIG. 9(a) shows a case where two DL CCs are linked to one UL CC and FIG. 9(b) shows a case where one DL CC is linked to two UL CCs, the number of CCs constituting a DL and a UL and a linkage ratio of the DL CC and the UL CC can change variously according to a carrier aggregation system to which the present invention is applied, and the content proposed in the present invention can also apply to a symmetric carrier aggregation system in which a CC constituting the DL and a CC constituting the UL are 1:1 linked.

A carrier having backward compatibility in the LTE-A system is accessible by the conventional UE by considering compatibility with UEs of the conventional 3GPP LTE system, and can function as independent one carrier or as a part of carrier aggregation. The carrier having backward compatibility is always configured in a pair form of the DL and the UL in an FDD system. For this, a carrier not having backward compatibility is not accessible to the conventional UE since the carrier is newly defined without considering compatibility with UEs operating in the conventional LTE system.

In a carrier aggregation system, a cell-specific or/and UE-specific method can be taken into account as a form of using one or a plurality of carriers. In the following description of the present invention, the cell-specific method implies a carrier configuration from the perspective of any cell or BS and the UE-specific method implies a carrier configuration from the perspective of a UE.

The cell-specific carrier aggregation may have a form of carrier aggregation configured by any BS or cell. In case of an FDD system, a form of the cell-specific carrier aggregation may be a form in which a DL and UL linkage is determined according to a Tx-Rx separation specified in 3GPP LTE release-8/LTE-A. For example, a carrier frequency in the UL and the DL can be designated by an E-UTRA absolute radio frequency channel number (EARFCN) in the range 0 to 65535. The EARFCN and a carrier frequency in MHz unit for the DL may have a relation given by Equation 2 below.

$$F_{DL} = F_{DL\_low} + 0.1(N_{DL} - N_{\textit{Offs-DL}})$$ [Equation 2]

In Equation 2 above, $N_{DL}$ is a DL EARFCN, and $F_{DL\_low}$ and $N_{\textit{Offs-DL}}$ are given by Table 3 below.

TABLE 3

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 6001199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

An E-UTRA transmission channel (carrier centre frequency) to reception channel (carrier centre frequency) separation based on transmission and reception channel bandwidths can be defined by Table 4 below.

TABLE 4

| Frequency Band | TX - RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | −31 MHz |
| 14 | −30 MHz |
| 17 | 30 MHz |

For details related to the above description, the section 5.7 of 3GPP TS 36.101 V8.4.0 released in December, 2008 can be incorporated by reference.

In the carrier aggregation system, a PDCCH monitoring DL CC set (hereinafter, simply referred to as a monitoring DL CC set) implies a set of DL CCs for monitoring a PDCCH, that is, a control channel for transmitting control information by a specific UE. The PDCCH monitoring DL CC set can be configured in a UE-specific or cell-specific manner.

Cross-carrier scheduling is a scheduling method capable of performing resource allocation of a PDSCH transmitted by using a different carrier through a PDCCH transmitted by using a specific CC and/or resource allocation of a PUSCH transmitted by using another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

A system supporting cross-carrier scheduling may include the CIF in the existing DCI format. For example, in an LTE-A system, the CIF can be added to the existing format (i.e., a DCI format used in LTE) and thus one to three bits can be extended, and a PDCCH structure can reuse the existing coding scheme, resource allocation scheme (i.e., CCE-based resource mapping), etc.

The system supporting cross-carrier scheduling can also support non cross-carrier scheduling. The non cross-carrier scheduling is a scheduling scheme in which resource allocation of a PDSCH of the same CC is performed through a PDCCH transmitted through a specific CC, and resource allocation of a PUSCH transmitted through one CC linked to the specific CC is performed. The CIF may not be included in case of the non cross-carrier scheduling.

A BS can semi-statically configure whether the cross-carrier scheduling is activated. That is, the BS can semi-statically configure whether the CIF is included in the DCI format, and can configure it in a UE (or UE group) specific or cell specific manner. According to the semi-static configuration, a signaling overhead between the BS and the UE can be decreased.

When the cross-carrier scheduling is activated, the number of blind decoding attempts can be determined according to whether a link relation is established between a monitoring DL CC and a scheduled DL CC.

Figure 10:
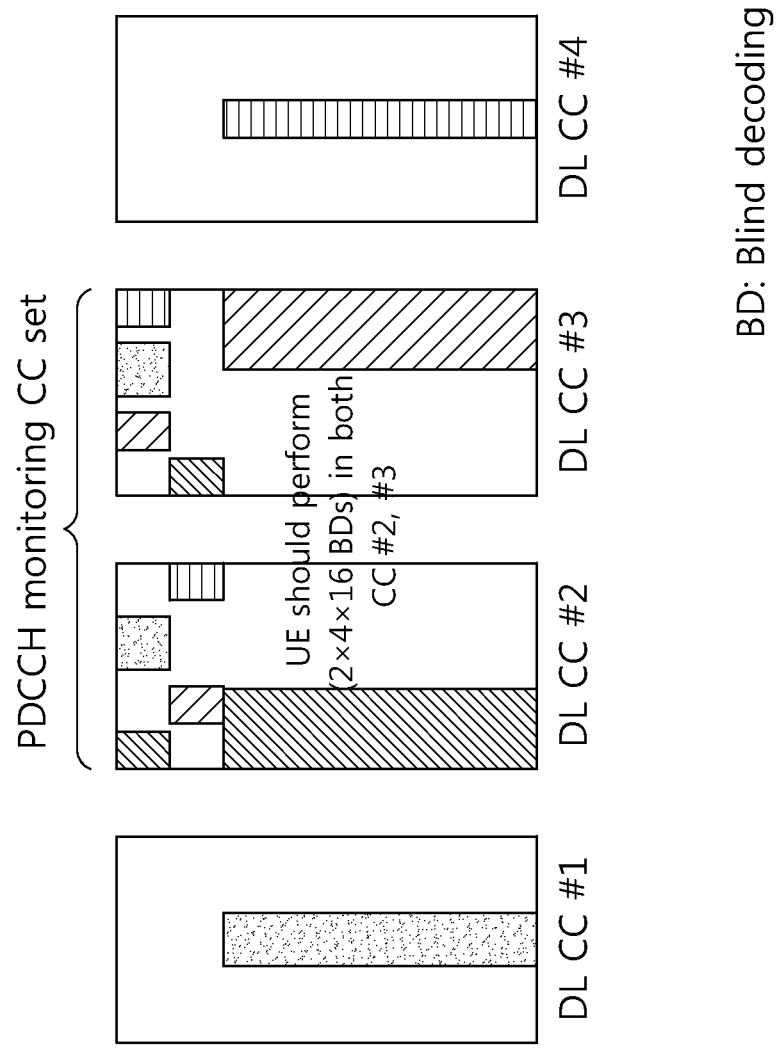
FIG. 10 shows a case where there is no link relation between a monitoring DL component carrier (CC) and a scheduled DL CC.

FIG. 10 shows a case where there is no link relation between a monitoring DL CC and a scheduled DL CC.

Referring to FIG. 10, a monitoring DL CC set includes a DL CC#2 and a CL CC#3, and a DL CC scheduled by using downlink control information transmitted through a monitoring DL CC is a DL CC#1 to a DL CC#4. Hereinafter, the DL CC scheduled by using the downlink control information transmitted through the monitoring DL CC is simply referred to as a scheduled DL CC. If there is no link relation between the monitoring DL CC and the scheduled DL CC, a UE must perform blind decoding to detect a PDCCH for all scheduled DL CCs in each monitoring DL CC. That is, the UE attempts PDCCH detection for the DL CC#1, DL CC#2, DL CC#3, and DL CC#4 in a control region of the DL CC#2, and also attempts PDCCH detection for the DL CC#1 to the DL CC#4 in a control region of the DL CC#3. Therefore, the total number of blind decoding attempts to be performed by the UE in a UE specific search space is 2×4×16=128.

Figure 11:
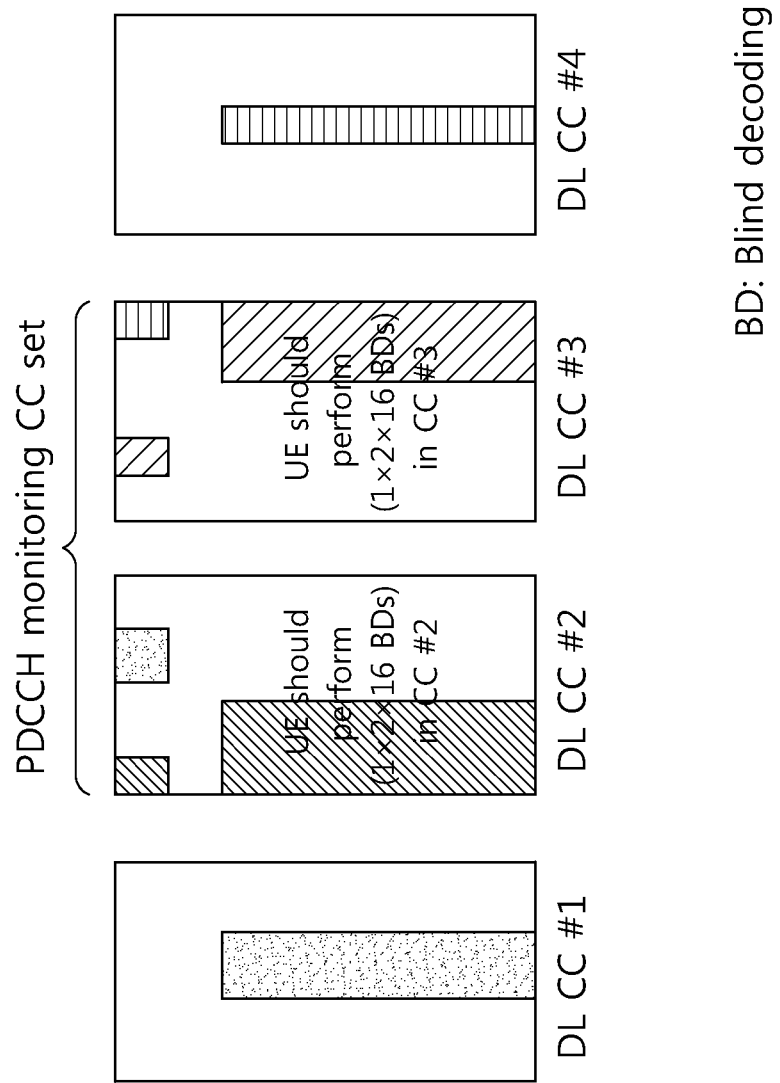
FIG. 11 shows a case where there is a link relation between a monitoring DL CC and a scheduled DL CC.

FIG. 11 shows a case where there is a link relation between a monitoring DL CC and a scheduled DL CC.

Referring to FIG. 11, a monitoring DL CC set includes a DL CC#2 and a DL CC#3, and a scheduled DL CC includes a DL CC#1 to a DL CC#4. In this case, there is a link relation in which a PDCCH for the DL CC#1 and the DL CC#2 can be transmitted in a control region of the DL CC#2, and a PDCCH for the DL CC#3 and the DL CC#4 can be transmitted in a control region of the DL CC#3. Such a link relation can be predetermined between a UE and a BS, or can be reported to the UE through a higher layer signal such as RRC.

As such, when the link relation exists between the monitoring DL CC and the scheduled DL CC, the number of blind decoding attempts to be performed by the UE is decreased. Considering the number of blind decoding attempts to be performed in a UE-specific search space, since the UE knows that only the PDCCH for the DL CC#1 and the DL CC#2 can be transmitted in the region of the DL CC#2, the number of blind decoding attempts to be performed is only 1×2×16=32. In addition, since the UE knows that only the PDCCH for the DL CC#3 and the DL CC#4 can be transmitted in the control region of the DL CC#3, the number of blind decoding attempts to be performed is only 1×2×16=32. Therefore, the total number of blind decoding attempts to be performed by the UE is 64.

As such, if the link relation exists between the monitoring DL CC and the scheduled CC, there is an advantage in that the number of blind decoding attempts to be performed by the UE is significantly decreased. In addition, a DL grant or UL grant for data transmitted in the scheduled CC is transmitted only in one monitoring DL CC.

Figure 12:
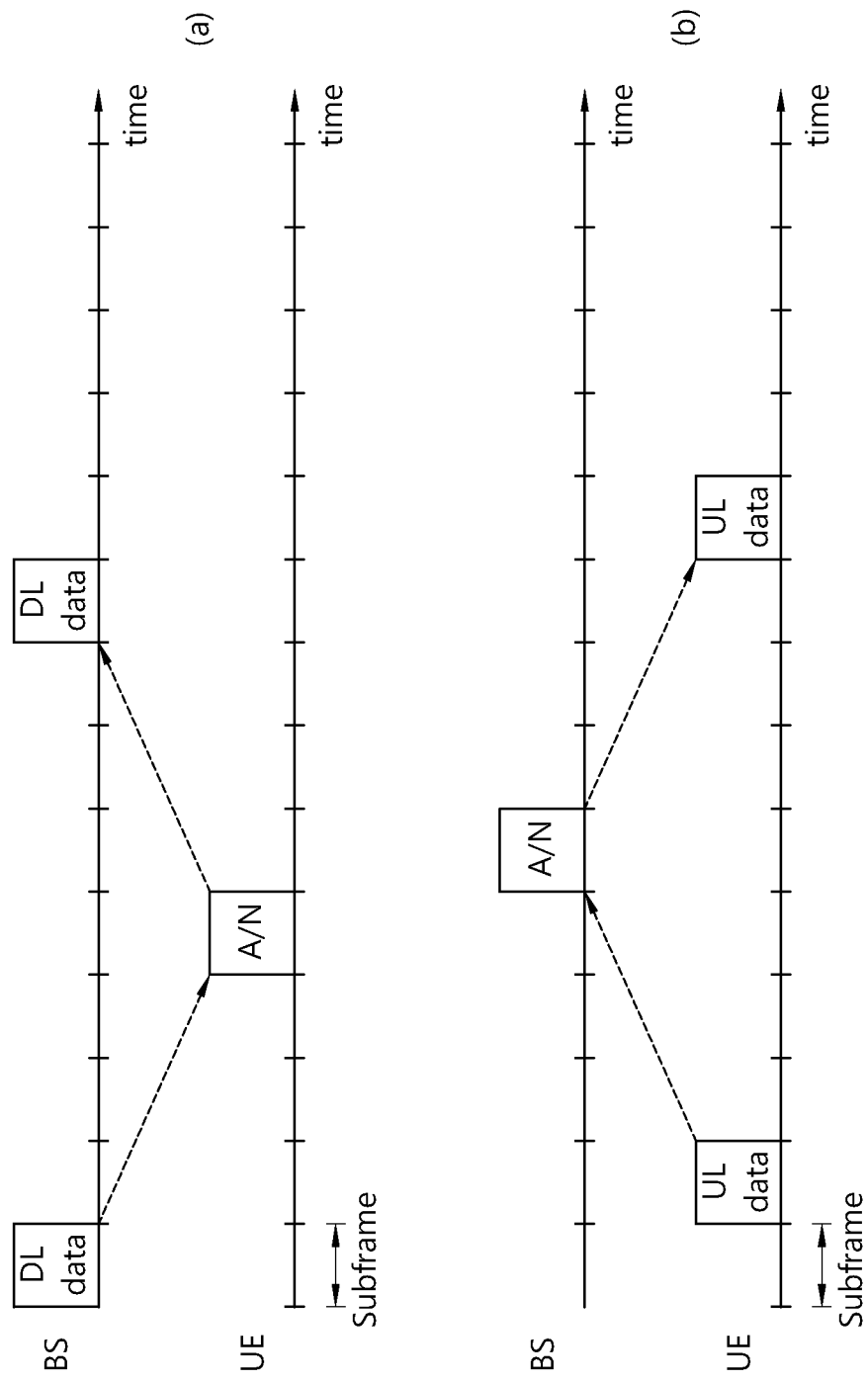
FIG. 12 shows a method of performing hybrid automatic repeat request (HARQ) in a single-carrier system.

FIG. 12 shows a method of performing HARQ in a single-carrier system.

Referring to FIG. 12($a$), a UE which receives DL data from a BS transmits acknowledgement (ACK)/not-acknowledgement (NACK) information after a specific time elapses. The DL data can be transmitted on a PDSCH indicated by a PDCCH. The ACK/NACK signal is ACK information if the DL data is successfully decoded, and is NACK information if decoding of the DL data fails. Upon receiving the NACK information, the BS can retransmit the DL data until the number of retransmission attempts reaches a maximum retransmission number.

Resource allocation or a transmission time of the ACK/NACK signal for the DL data can be dynamically reported by the BS through signaling, or can be pre-agreed according to the resource allocation or the transmission time of the DL data.

Referring to FIG. 12($b$), a UE transmits UL data, and a BS transmits ACK/NACK information after a specific time elapses. The UL data can be transmitted on a PUSCH indicated by a PDCCH. The ACK/NACK information can be transmitted through a PHICH. The UE transmits new UL data or retransmits data according to the ACK/NACK transmitted by the BS.

Figure 13:
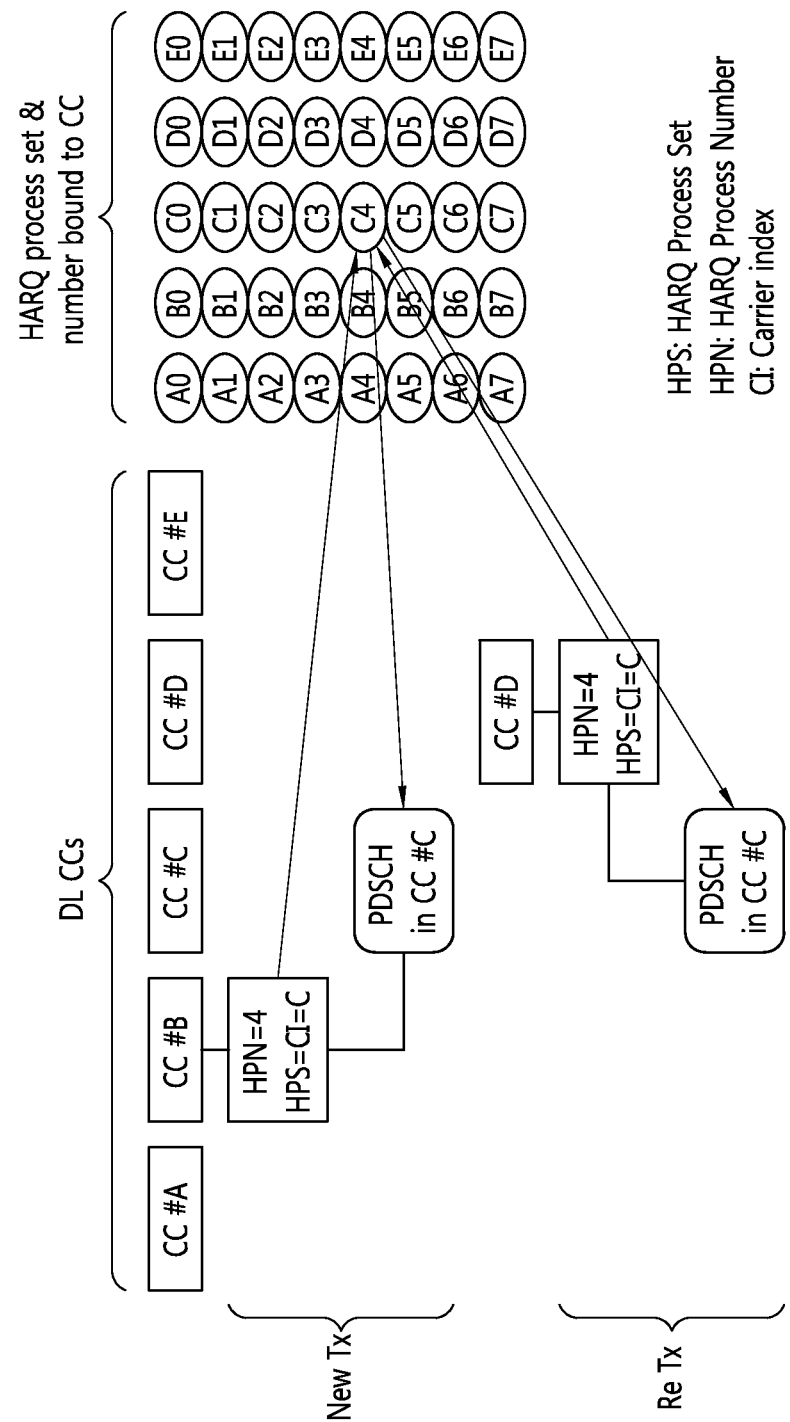
FIG. 13 shows a method of performing HARQ in a multi-carrier system.

FIG. 13 shows a method of performing HARQ in a multi-carrier system.

If a carrier aggregation is used, each CC may have individually one HARQ entity and one transport block. That is, an HARQ process is performed in the same CC. For example, if a BS transmits DL data to a UE through a DL CC#1 and thereafter receives a NACK signal from the UE, retransmitted DL data is transmitted through the same CC, that is, the DL CC#1. Referring to FIG. 13, for example, in a DL CC#C, 8 HARQ processes C0, C1, C2, C3, C4, C5, C6, and C7 can be performed, and a transport block can be transmitted for each CC. In this case, a DL CC for which initial transmission of DL data is performed must be identical to a DL CC in which retransmission is performed. For example, if the DL receives the initially transmitted DL data through the DL CC#C but fails in the decoding of the data, the UE may need to receive the DL data again through the DL CC#C.

In the UE, a DL CC for receiving a DL grant may be different from a DL CC for receiving DL data due to cross-carrier scheduling. For example, the UE may receive a DL grant for the DL CC#C through a DL CC#B, and may receive DL data through the DL CC#C. If decoding of the DL data fails, the UE transmits NACK to the BS. The UE may receive a DL grant for retransmission DL data through a DL CC#D. In this case, the DL grant for retransmission may indicate the DL CC#C and a radio resource for the DL CC#C. That is, it can be configured such that the initially transmitted DL data and the retransmitted DL data are transmitted through the same DL CC.

As described above with reference to FIG. 11, in order to decrease the number of blind decoding attempts, resource allocation information for any CC for transmitting PDSCH/PUSCH can be transmitted in one CC having a link relation. That is, a PDCCH for a scheduled DL CC can be transmitted through one monitoring DL CC. In addition, as described above with reference to FIG. 13, it can be configured such that the initially transmitted data and the retransmitted data are transmitted through the same scheduled CC.

Considering the two aspects above, PDCCH transmission related to initial data transmission and data retransmission must be performed in the same CC in a multi-carrier system. That is, the PDCCH for retransmission must be performed in the same CC as the PDCCH for initial transmission. In addition, when assuming a transport block and an HARQ entity for each CC, initial transmission and retransmission of the PDSCH or the PUSCH must also be performed in the same CC.

If an error occurs in initial data transmission and thus retransmission is necessary in a case where cross-carrier scheduling is activated, a CIF included in the PDCCH in initial transmission may be unnecessary in the PDCCH for a grant of retransmission. This is because the initial transmission and the retransmission must be performed through the same CC.

Therefore, a PDCCH for resource allocation when performing HARQ retransmission may have a format different from that of a PDCCH for initial transmission.

Now, a method of performing DL HARQ and a method of performing UL HARQ will be first described according to the present invention, and then a difference between a PDCCH for initial transmission and a PDCCH for retransmission when performing HARQ and a method of utilizing the difference will be described.

Figure 14:
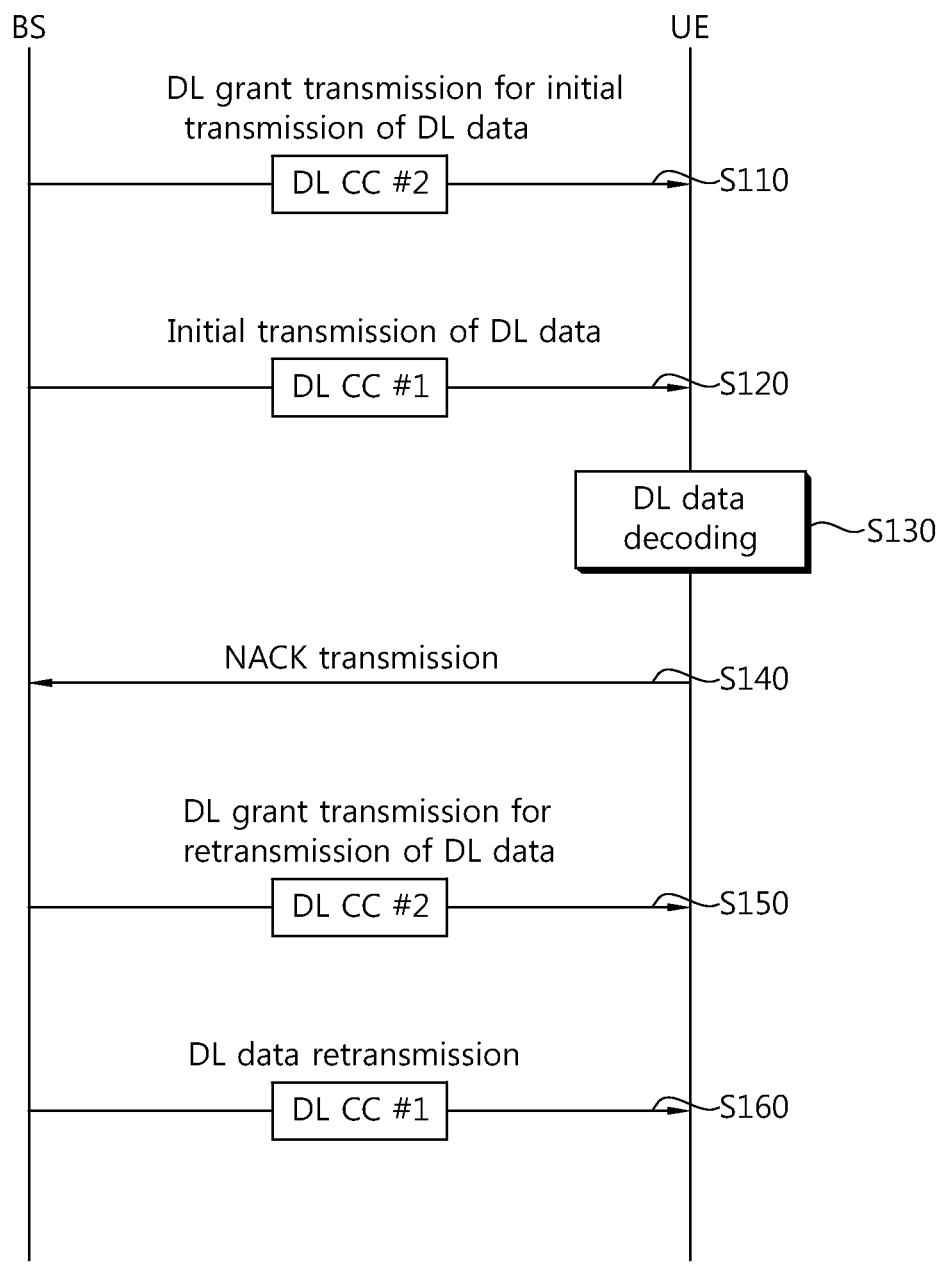
FIG. 14 shows a method of performing DL HARQ according to an embodiment of the present invention.

FIG. 14 shows a method of performing DL HARQ according to an embodiment of the present invention.

Between a DL CC#1 and a DL CC#2, it is assumed that the DL CC#2 is a monitoring DL CC, and the DL CC#1 is a scheduled DL CC.

Referring to FIG. 14, a BS transmits a DL grant for initial transmission of DL data (step S110). The DL grant may be transmitted through the DL CC#2 which is a monitoring DL CC. The BS initially transmits the DL data through the DL CC#1 (step S120). Herein, initial transmission implies transmission of new DL data.

A UE receives the DL data in a radio resource identified through the DL grant for initial transmission and thereafter decodes the data (step S130). The UE transmits ACK if the DL data is successfully decoded, and transmits NACK if decoding fails (step S140).

If the NACK is received or the ACK is not received, the BS transmits a DL grant for retransmission of the DL data (step S150). In this case, the DL grant for retransmission is transmitted in the same DL CC as the DL CC in which the DL grant for initial transmission is transmitted. Therefore, the BS transmits the DL grant for retransmission through the DL CC#2.

The BS retransmits the DL data (step S160). The BS retransmits the DL data through the same DL CC (i.e., the DL CC#1) as the DL CC used for initial transmission of the DL data.

Figure 15:
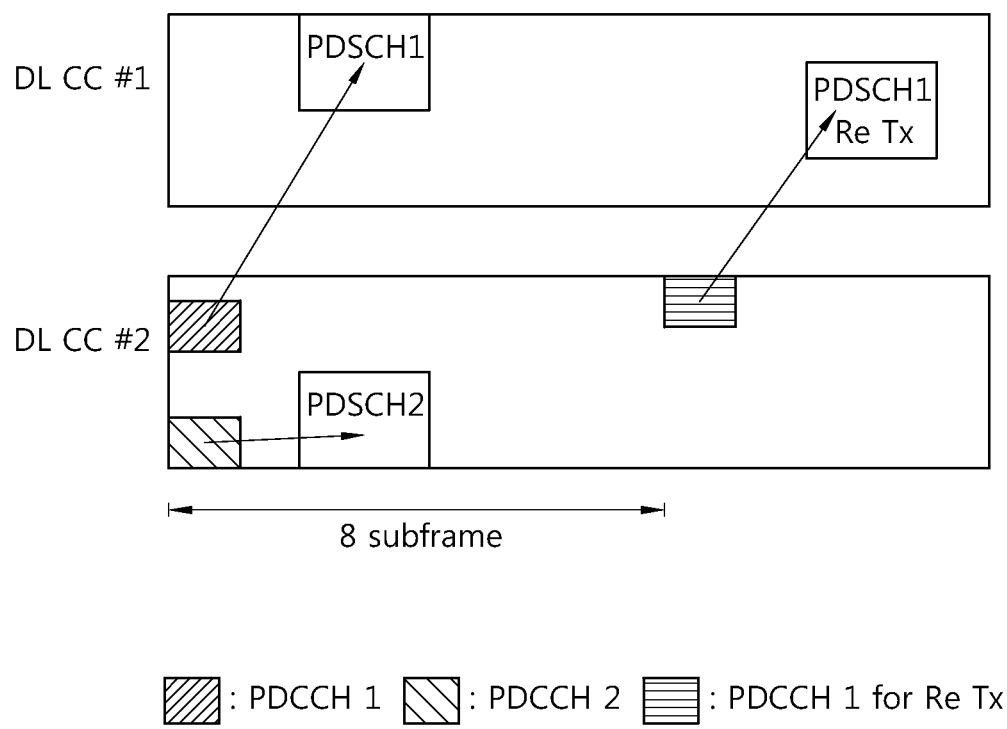
FIG. 15 is a diagram showing the concept of the process of FIG. 14.

FIG. 15 is a diagram showing the concept of the process of FIG. 14.

Referring to FIG. 15, a BS transmits a PDCCH1 and a PDCCH2 through a DL CC#2. The PDCCH1 includes a CIF field indicating a DL CC#1 and a DL grant for a PDSCH1. If NACK is received from a UE, the BS may transmit the PDCCH1 for retransmission through the DL CC#2 at a time corresponding to 8 subframes later from a subframe in which the PDSCH1 is transmitted, and may retransmit the PDSCH1-through the DL CC#1.

Figure 16:
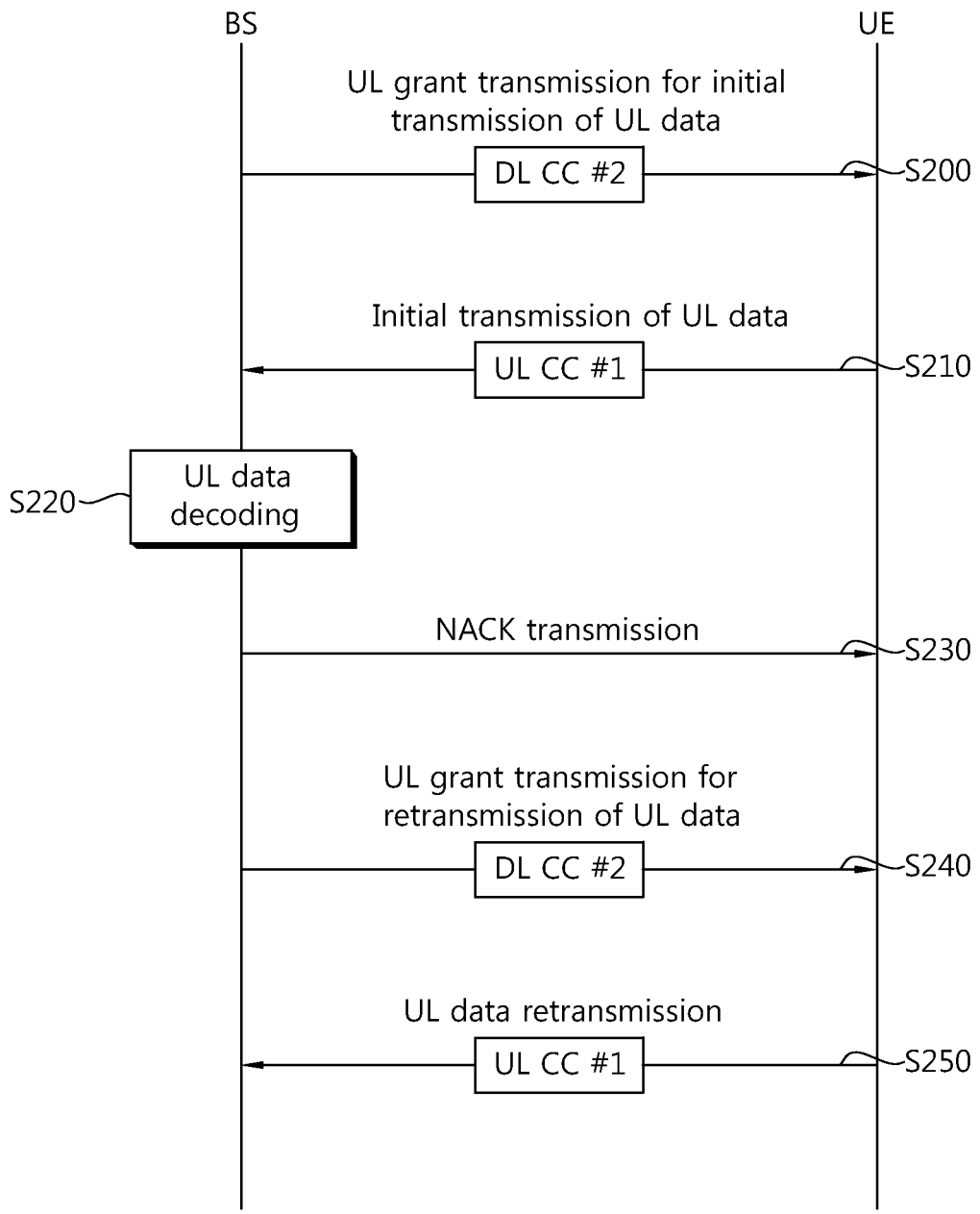
FIG. 16 shows a method of performing UL HARQ according to an embodiment of the present invention.

FIG. 16 shows a method of performing UL HARQ according to an embodiment of the present invention.

Referring to FIG. 16, a BS transmits a UL grant for initial transmission of UL data (step S200). The UL grant can be transmitted, for example, through a DL CC#2 which is a monitoring DL CC. A UE initially transmits the UL data (step S210). Herein, initial transmission implies transmission of new UL data. The UE can initially transmit the UL data, for example, through a UL CC#1.

After receiving the UL data, the BS decodes the data (step S220). The BS transmits ACK if the UL data is successfully decoded, and transmits NACK if decoding fails, through a PHICH (step S230).

If the NACK is received or the ACK is not received, the BS transmits a UL grant for retransmission of the UL data (step S240). In this case, the UL grant for retransmission is transmitted in the same DL CC as the DL CC in which the UL grant for initial transmission is transmitted. Therefore, the BS transmits the UL grant for retransmission through the DL CC#2.

The UE retransmits the UL data (step S250). The UE retransmits the UL data through the same UL CC (i.e., the UL CC#1) as the UL CC used for initial transmission of the UL data.

Now, an example of configuring a PDCCH including a UL grant or DL grant for retransmission when performing HARQ described with reference to FIG. 15 and FIG. 16 will be described.

Figure 17:
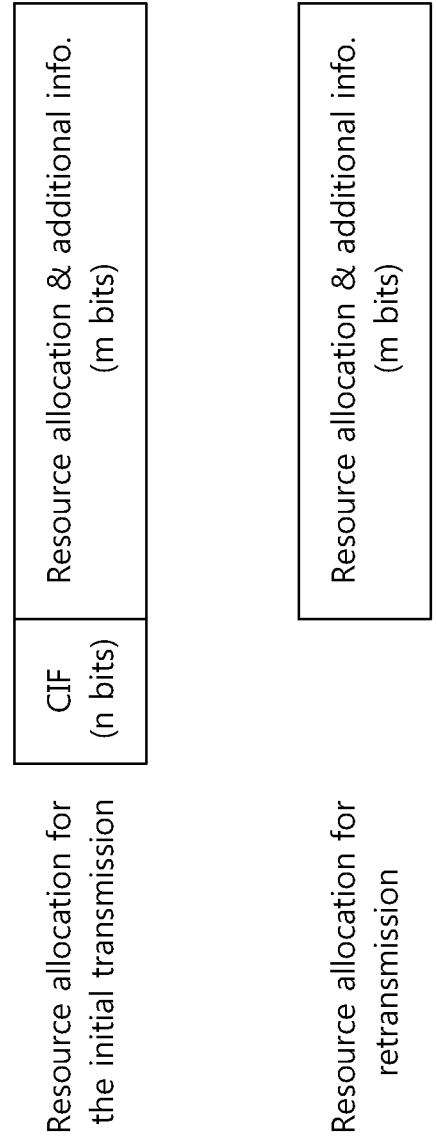
FIG. 17 is an example of a physical downlink control channel (PDCCH) including a grant for data retransmission when performing HARQ.

FIG. 17 is an example of a PDCCH including a grant for data retransmission when performing HARQ.

Referring to FIG. 17, the PDCCH for HARQ retransmission may be configured in a format in which a CIF is excluded. For example, in a PDCCH for initial transmission of DL data, a DL grant can be transmitted by being configured in such a format that a CIF field is n bits (e.g., 3 bits) and m bits are included for resource allocation and additional information. In the PDCCH for retransmission of the DL data, a DL grant can be transmitted by being configured in such a format that a CIF field is excluded and m bits are included for resource allocation and additional information.

Table 5 below shows an example of the value m with respect to a bandwidth and a DCI format.

TABLE 5

| DCI Format | | Bandwidth (RBs) | | | | | |
|---|---|---|---|---|---|---|---|
| | | 6 | 15 | 25 | 50 | 75 | 100 |
| Format 0 | | 37 | 38 | 41 | 43 | 43 | 44 |
| Format 1 | | 35 | 39 | 43 | 47 | 49 | 55 |
| Format 1A | | 37 | 38 | 41 | 43 | 43 | 44 |
| Format 1B | 2Tx | 38 | 41 | 43 | 44 | 45 | 46 |
| | 4Tx | 41 | 43 | 44 | 46 | 47 | 49 |
| Format 1C | | 24 | 26 | 28 | 29 | 30 | 31 |
| Format 1D | 2Tx | 38 | 41 | 43 | 44 | 45 | 46 |
| | 4Tx | 41 | 43 | 44 | 46 | 47 | 49 |
| Format 2 | 2Tx | 47 | 50 | 55 | 59 | 61 | 67 |
| | 4Tx | 50 | 53 | 58 | 62 | 64 | 70 |
| Format 2A | 2Tx | 44 | 47 | 52 | 57 | 58 | 64 |
| | 4Tx | 46 | 49 | 54 | 58 | 61 | 66 |
| Format 3/3A | | 37 | 38 | 41 | 43 | 43 | 44 |

That is, if the UE transmits NACK to the BS through a PUCCH with respect to DL data, the BS must retransmit the DL data. In this case, a PDCCH including a DL grant for DL data retransmission can be configured in such a format that a CIF field is excluded. The UE can perform blind decoding under the assumption that a PDCCH which is received four subframes later after transmitting NACK which is transmitted four subframes later from a subframe in which initially transmitted DL data is received has a format not having a CIF field (i.e., having m bits).

Figure 18:
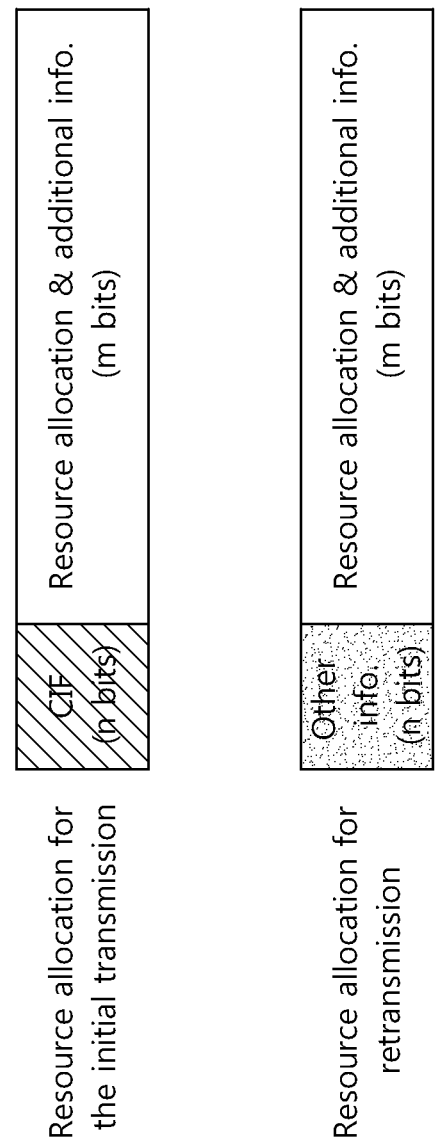
FIG. 18 shows another example of a PDCCH including a grant for data retransmission when performing HARQ.

FIG. 18 shows another example of a PDCCH including a grant for data retransmission when performing HARQ.

Referring to FIG. 18, the PDCCH for HARQ retransmission may have the same format as the PDCCH for initial transmission. That is, in a PDCCH for initial transmission of the DL data and a PDCCH for retransmission of the DL data, a DL grant can be transmitted by being configured in such a format that a CIF field is n bits (e.g., 3 bits) and m bits are included for resource allocation and additional information. However, in the PDCCH for retransmission, the CIF field can be used for other usages than indicating a CC for transmitting the PDSCH or the PUSCH.

For example, the CIF field can be used for the usage of confirming whether an error occurs in a resource allocation field for retransmission. That is, in addition to CRC check, it can be utilized for the usage of additionally confirming whether an error occurs.

Alternatively, the CIF field can be reserved for a field additionally included in a DCI format transmitted through the PDCCH. That is, when there is a field additionally required in the old DCI format, the CIF field can be used to prevent the old DCI format from being changed.

Since a PDCCH for HARQ retransmission has the same format as a PDCCH for initial transmission, an additional overhead is decreased when the UE performs blind decoding. However, the CIF field can be interpreted as other usages than indicating the CC for transmitting the PDSCH or the PUSCH. Therefore, a value of the CIF field may have a value different from the PDCCH for initial transmission, and even if they have the same values, it is interpreted as indicating different information.

Figure 19:
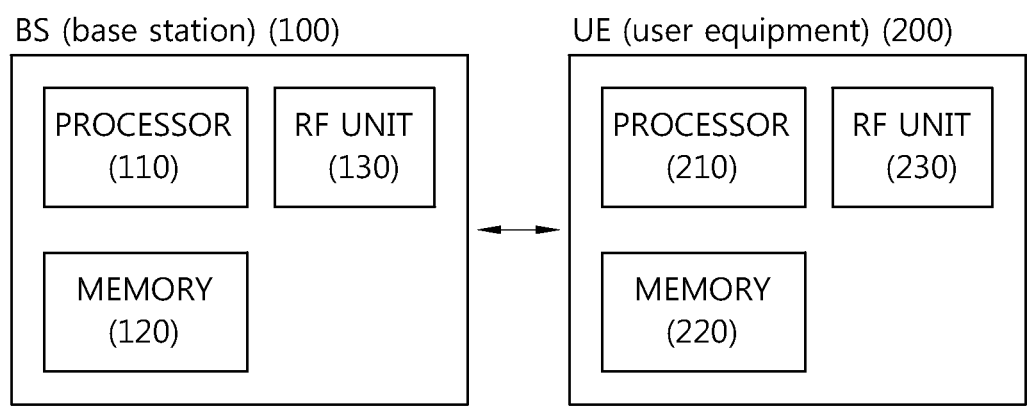
FIG. 19 is a block diagram showing a BS and a UE.

FIG. 19 is a block diagram showing a BS and a UE.

A BS 100 includes a processor 110, a memory 120, and a radio frequency (RF) unit 130. The processor 110 implements the proposed functions, procedures, and/or methods. For example, the processor 110 can report a link relation among a monitoring DL CC set, a monitoring DL CC, and a scheduled CC to a UE through a higher layer signal such as RRC. In addition, a grant for initial data transmission and a grant for data retransmission are transmitted when performing HARQ. In this case, the grant for retransmission can be used for other usages even if it includes or does not include a CIF field. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 monitors a DL grant for initial DL data transmission in a monitoring DL CC, and receives initial DL data through a scheduled DL CC indicated by the DL grant. Further, the processor 210 decodes the initial DL data, and if the decoding fails, transmits a not-acknowledgement (NACK) signal to the BS. The processor 210 monitors the DL grant for DL data retransmission in the monitoring DL CC, and receives DL data retransmitted through the scheduled DL CC. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit and/or a converter for mutually converting a baseband signal and a radio signal. The memory 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A method of performing hybrid automatic repeat request (HARQ) in a carrier aggregation system, the method performed by a user equipment (UE) and comprising:
   receiving a first downlink (DL) grant for initial DL data transmission in a first DL component carrier (CC), the first DL grant including a carrier indication field (CIF) indicating a second DL CC and resource allocation information for the initial DL data transmission;
   receiving initial DL data through the second DL CC indicated by the CIF in the first DL grant;
   decoding the initial DL data;
   transmitting a negative acknowledgement (NACK) signal when the decoding of the initial DL data fails;
   receiving a second DL grant for retransmission of the DL data in the first DL CC;
   determining in which of the first DL CC and the second DL CC the retransmitted DL data is to be received based on the received second DL grant,
   wherein the retransmitted DL data is determined to be received in the second DL CC instead of the first DL CC if a CIF in the second DL grant does not indicate the second DL CC,
   wherein the CIF in the second DL grant is transformed to allow the UE to detect an error of resource allocation information for the retransmitted DL data in the second DL grant, rather than the CIF in the second DL grant indicating the second DI CC; and
   receiving the retransmitted DL data in the second DL CC.

2. The method of claim 1, wherein the second DL grant has a same bit size as the first DL grant.

3. The method of claim 1, wherein the first DL CC is any one of a plurality of DL CCs configured through a higher layer signal.

4. The method of claim 1, wherein the first DL grant and the second DL grant are received through a physical downlink control channel (PDCCH).

5. The method of claim 1, wherein the CIF comprises 3 bits.

6. The method of claim 1, wherein the NACK signal is transmitted four subframes later from a subframe in which the initial DL data is received.

7. The method of claim 6, wherein a subframe in which the retransmitted DL data is received is a subframe located 8 subframes later from the subframe in which the initial DL data is received.

8. The method of claim 1, wherein the first DL CC and the second DL CC are component carriers having a same bandwidth and different center frequencies.

9. A user equipment comprising:
   a radio frequency (RF) unit for transmitting and receiving a radio signal; and
   a processor coupled to the RF unit, wherein the processor is for:
   receiving a first downlink (DL) grant for initial DL data transmission in a first DL component carrier (CC), the first DL grant including a carrier indication field (CIF) indicating a second DL CC and resource allocation information for the initial DL data transmission;
   receiving initial DL data through the second DL CC indicated by the CIF in the first DL grant;
   decoding the initial DL data;
   transmitting a negative-acknowledgement (NACK) signal when the decoding of the initial DL data fails;

receiving a second DL grant for retransmission of the DL data in the first DL CC;

determining in which of the first DL CC and the second DL CC the retransmitted DL data is to be received based on the received second DL grant, wherein the retransmitted DL data is determined to be received in the second DL CC instead attic first DL CC if a CIF in the second DL grant does not indicate the second DL CC, wherein the CIF in the second DL grant is transformed to allow the UE to detect an error of resource allocation information for the retransmitted DL data, rather than the CIF in the second DL grant indicating the second DL CC; and receiving the retransmitted DL data in the second DL CC.

10. The user equipment of claim 9, wherein the second DL grant has a same bit size as the first DL grant.

* * * * *